US008738863B2

United States Patent
Tiedens (10) Patent No.: US 8,738,863 B2
(45) Date of Patent: May 27, 2014

(54) CONFIGURABLE MULTI-LEVEL BUFFERING IN MEDIA AND PIPELINED PROCESSING COMPONENTS

(75) Inventor: Stanley G. Tiedens, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 12/567,733

(22) Filed: Sep. 25, 2009

(65) Prior Publication Data

US 2011/0078386 A1  Mar. 31, 2011

(51) Int. Cl.
*G06F 12/00* (2006.01)

(52) U.S. Cl.
USPC ..... 711/154; 711/138; 711/140; 711/E12.001

(58) Field of Classification Search
USPC ............. 711/154, 202, 203, E12.001; 710/22
See application file for complete search history.

(56) References Cited

U.S. PATENT DOCUMENTS

| | | | |
|---|---|---|---|
| 6,292,855 B1 | 9/2001 | Johnson et al. | |
| 7,054,986 B2 | 5/2006 | Zhao et al. | |
| 7,568,057 B2 * | 7/2009 | Lees et al. | 710/52 |
| 7,620,749 B2 | 11/2009 | Biran et al. | |
| 2002/0082997 A1 * | 6/2002 | Kobata et al. | 705/51 |
| 2008/0168259 A1 | 7/2008 | Biran et al. | |

FOREIGN PATENT DOCUMENTS

| | | |
|---|---|---|
| CN | 101221543 A | 7/2008 |
| JP | 56060950 A | 5/1981 |
| JP | 06-131153 | 5/1994 |
| WO | 02/079971 A1 | 10/2002 |
| WO | 2005/104486 A1 | 11/2005 |

OTHER PUBLICATIONS

Office Action Received for German Patent Application No. 10 2010 033 615.7, mailed on Jun. 27, 2011, 4 pages of Office Action and 4 pages of English Translation.
Office Action Received for United Kingdom Patent Application No. GB1013383.3, mailed on Nov. 9, 2010, 4 pages of Office Action.
Office Action Received for United Kingdom Patent Application No. 1013383.3, mailed on Feb. 6, 2012, 5 pages of Office Action.
Office Action received for United Kingdom Patent Application No. 1013383.3 , mailed on Mar. 4, 2013, 3 pages.
Office Action received for Chinese Patent Application No. 201010507475.1 mailed on Jan. 29, 2013, 9 pages of Office Action and 13 pages of English Translation.
Office Action received for Taiwan Patent Application No. 099125944, mailed on Aug. 14, 2013, 12 pages of English Translation including Search Report and 8 pages of Office Action.
Office Action received for Chinese Patent Application No. 201010507475.1, mailed on Oct. 15, 2013, 9 pages of English Translation and 8 pages of Office Action.

* cited by examiner

*Primary Examiner* — Pierre-Michel Bataille
(74) *Attorney, Agent, or Firm* — Caven & Aghevli LLC (57) ABSTRACT

Methods and apparatus relating to buffering in media and pipelined processing components are described. In one embodiment, a buffer may include an arbiter to receive data structure information from a producer, a memory to store the information, and an address generator to indicate a location in the memory to store the data structure information. Other embodiments are also disclosed.

29 Claims, 7 Drawing Sheets

CONFIGURABLE MULTI-LEVEL BUFFERING IN MEDIA AND PIPELINED PROCESSING COMPONENTS

FIELD

The present disclosure generally relates to the field of electronics. More particularly, an embodiment of the invention relates to buffering in media and pipelined processing components.

BACKGROUND

In computing, a buffer generally refers to a storage area where data is temporarily stored. Most computing operations involve some sort of buffering, for example, where input data for a computation or output data resulting from a computation are stored. A buffer may also be used when data is moved from one location to another. As such, how a buffer is implemented may have significant effect on overall system efficiency or latency.

Moreover, differing types of data may require different types of implementations to achieve operational efficiency, lower product cost, or faster speed. Accordingly, design of buffers may become a complicated task.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments provide for buffering in media (and non-media) pipelined processing components. In an embodiment, a protocol is used to allow for coordination between producers, consumers, and/or multiple levels of hardware architecture. For example, a producer may communicate a data structure (e.g., setting forth formatting information) to a buffer which is then read by a consumer. This allows for configurability of a buffer. Also, the buffer may include multiple buffering levels which may be configured or added as need (for example, where more storage space is needed for a specific implementation).

As discussed herein, a producer generally refers to an agent that produces a transaction that is to be processed by a consumer. A protocol may generally represent an abstraction of a transaction that goes from a producer to a consumer. As discussed herein, the term transaction may be interchangeable with a packet. A packet may generally refer to a collection of data that may include one or more bits.

In some current systems, when buffering between a producer and a consumer, a state machine may be used and the state machine may have to be changed depending on the implementation. In contrast, an embodiment may utilize the same state machine (e.g., implementing the same protocol) even when the data in the packet changes, the word width of the packet changes, etc. This reduces the need for redesigns, time to market for products, and/or design costs. In one embodiment, a buffer, coupled between a consumer and a producer, may also include address generation logic, e.g., to provide address generation if a consumer or a producer needs to access system memory. Additionally, in some embodiments, the buffer may have an elastic or adjustable size dynamically.

Figure 1:
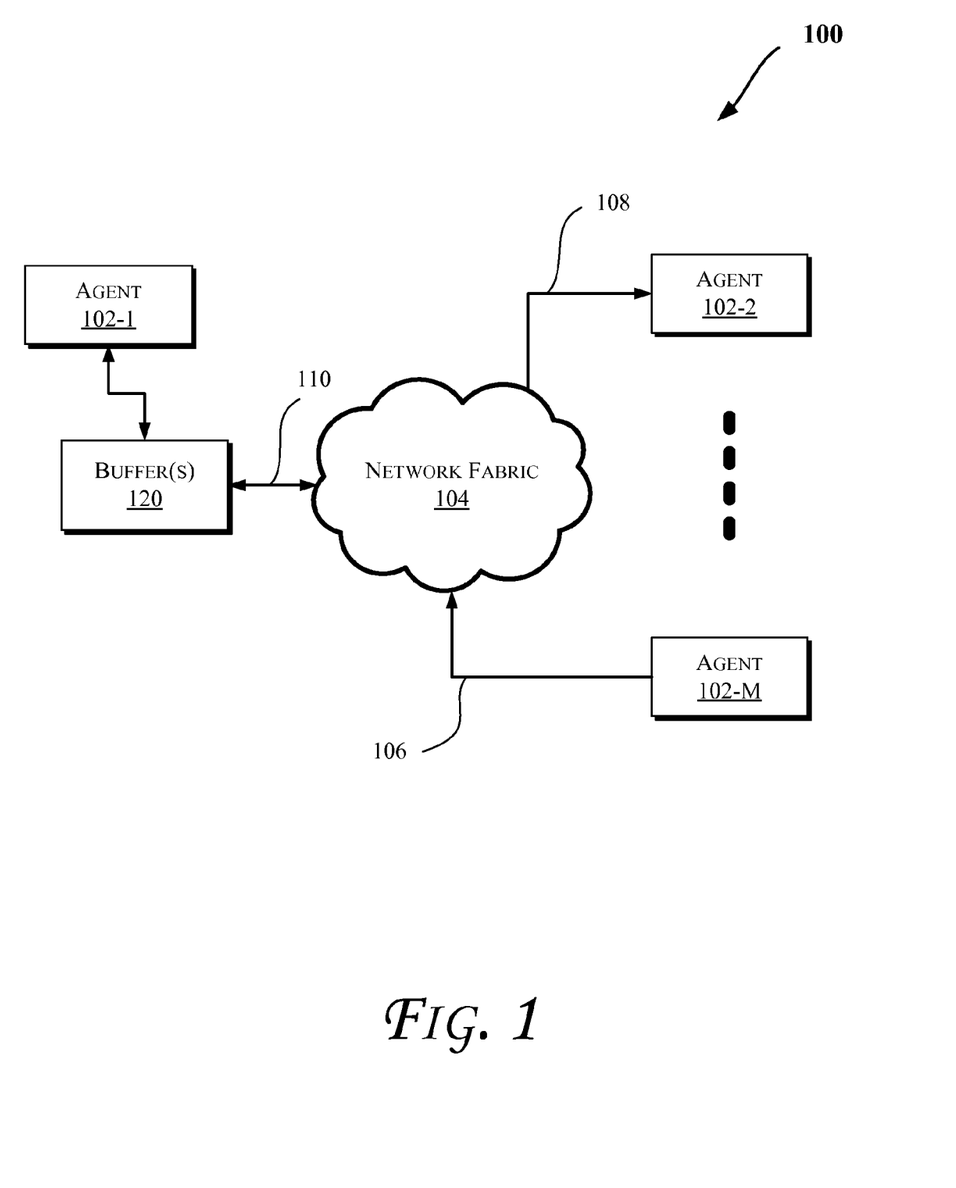
FIGS. 1 and 6-7 illustrate block diagrams of embodiments of computing systems, which may be utilized to implement various embodiments discussed herein.

Various computing systems may be used to implement embodiments, discussed herein, such as the systems discussed with reference to FIGS. 1 and 6-7. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 6-7. Moreover, the agents 102 may be consumers or producers.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, as shown in FIG. 1, the agents 102 may be coupled to other agents via one or more buffers 120. In an embodiment, the buffer 120 may be implemented as part of network fabric 104. Further details regarding various embodiments of the buffer 120 will be discussed with reference to FIGS. 2-7.

Figure 2:
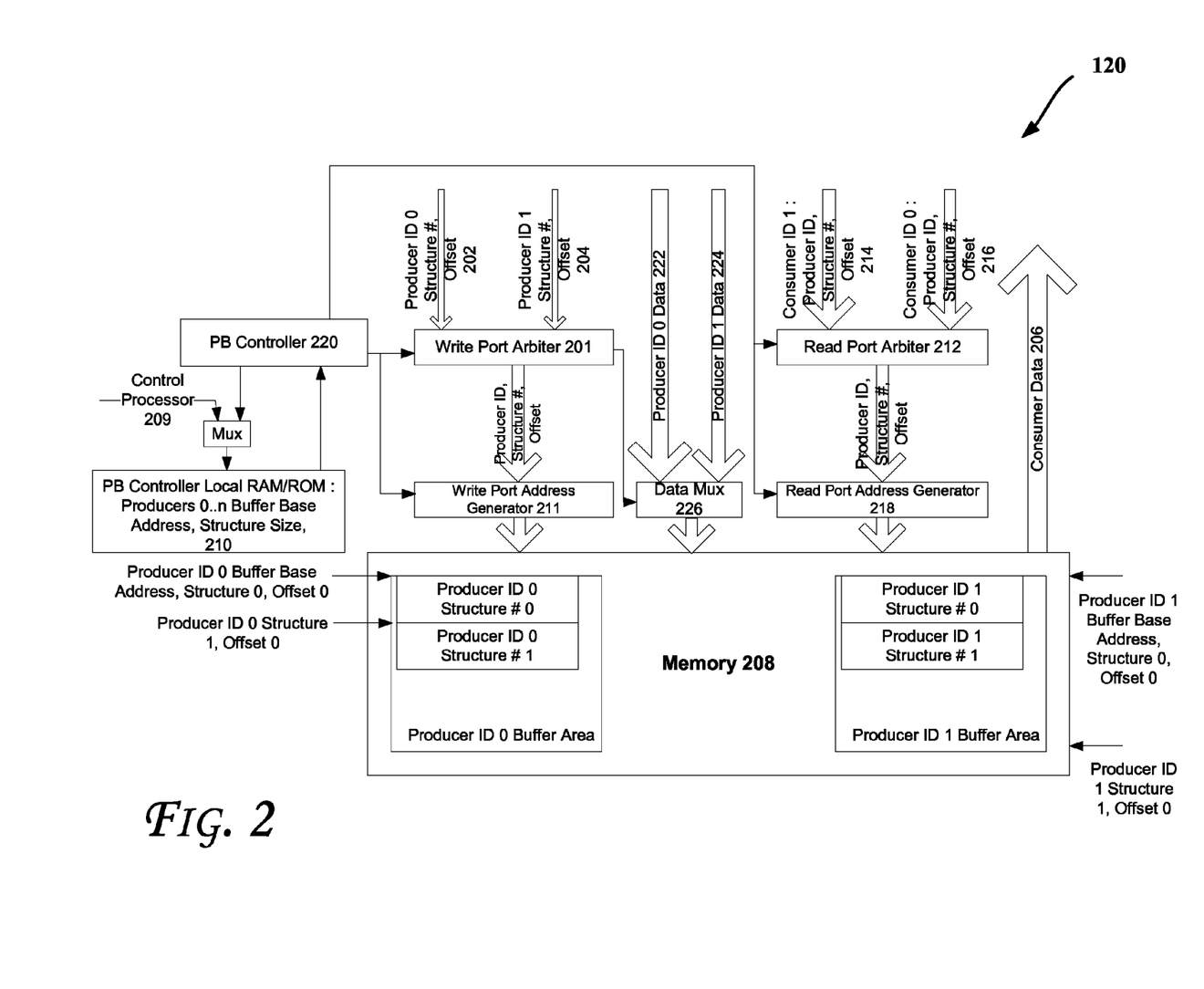
FIGS. 2-3 illustrate block diagrams of buffers according to some embodiments.

Referring to FIG. 2, a block diagram of the buffer 120 is illustrated, in accordance with an embodiment. As shown, the buffer 120 of FIG. 2 is implemented as a pipeline. In one embodiment, a pipeline buffering protocol (such as discussed herein, e.g., with reference to FIGS. 1-7) is designed to layer above the product specific buffering implementation. This allows hardware accelerators or co-processors to remain fairly stable over several design generations and products.

Also, the illustrated architecture in FIG. 2 provides a multi-level buffering scheme that services producers and consumers, and provides a minimum set of access information and almost no communication between producer and consumer to store, overflow, and fetch data. In some embodiment, multiple First Fill Last Spills (FFLS) levels may be coupled together (where each level may include one or more of the components shown in FIG. 2), with a last level (such as FFLS last level 300 of FIG. 3) having a coupling to a memory subsystem (such as memory 302 of FIG. 3) via a bus agent (such as bus agent 304 of FIG. 3).

As shown in FIG. 2, producers write data structures into the buffer (e.g., via write port arbiter 201 which arbitrators between multiple producer inputs 202/204), and consumers retrieve data 206 (which may also include data structure information) from the buffer 120 (e.g., that are stored in memory 208, which may be a Random Access Memory (RAM) or DDR (Double Data Rate) memory in some embodiments) over a consumer interface (not shown). In an embodiment, a consumer is to read the information corresponding to the data structure from the memory, in response to a signal that indicates the information is stored in its entirety in the memory, and the consumer then processes data from the producer in accordance with the data structure. The control processor 209 (which may be any of the processors discussed herein such as those discussed with reference to FIG. 6 or 7) or processor software may establish producer and consumer pairing and the number of data structures allowed in each buffer. The pairing and buffer depths may be programmed into a controller memory 210, as well as other data as discussed herein.

Further, a minimum set of ID (identifiers), structure number/index, and/or sub-structure offset is communicated from producer (e.g., 202 or 204) to buffer 120 (including to arbiter 201 and a write port address generator 211, which may generate address(es) corresponding to locations in memory 208) or from the consumer to buffering controller, e.g., including read port arbiter 212 (that arbitrates between multiple consumer inputs 214/216) and a read port address generator 218 (which may generate addresses for access to locations in memory 208).

Figure 6:
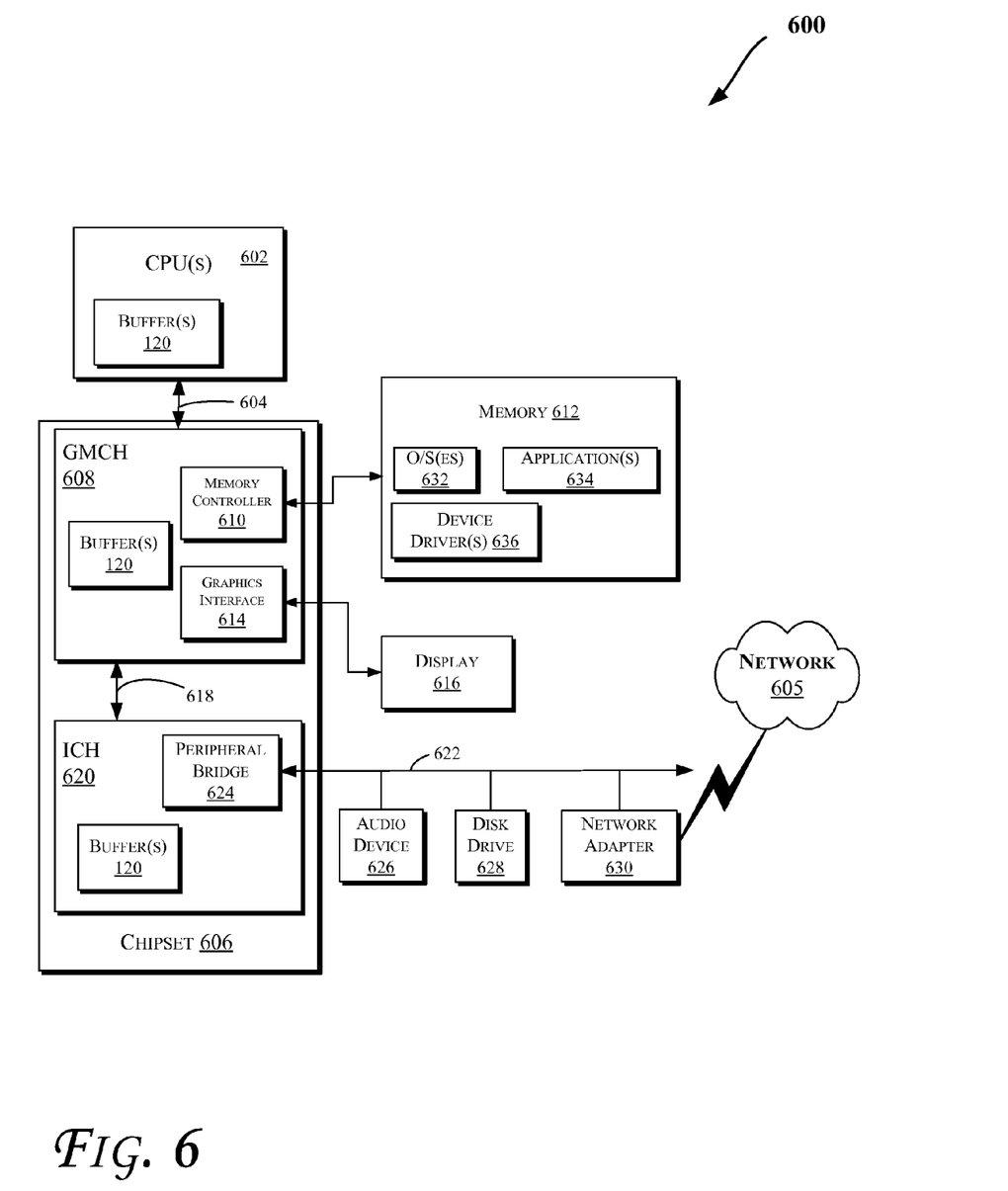
Figure 7:
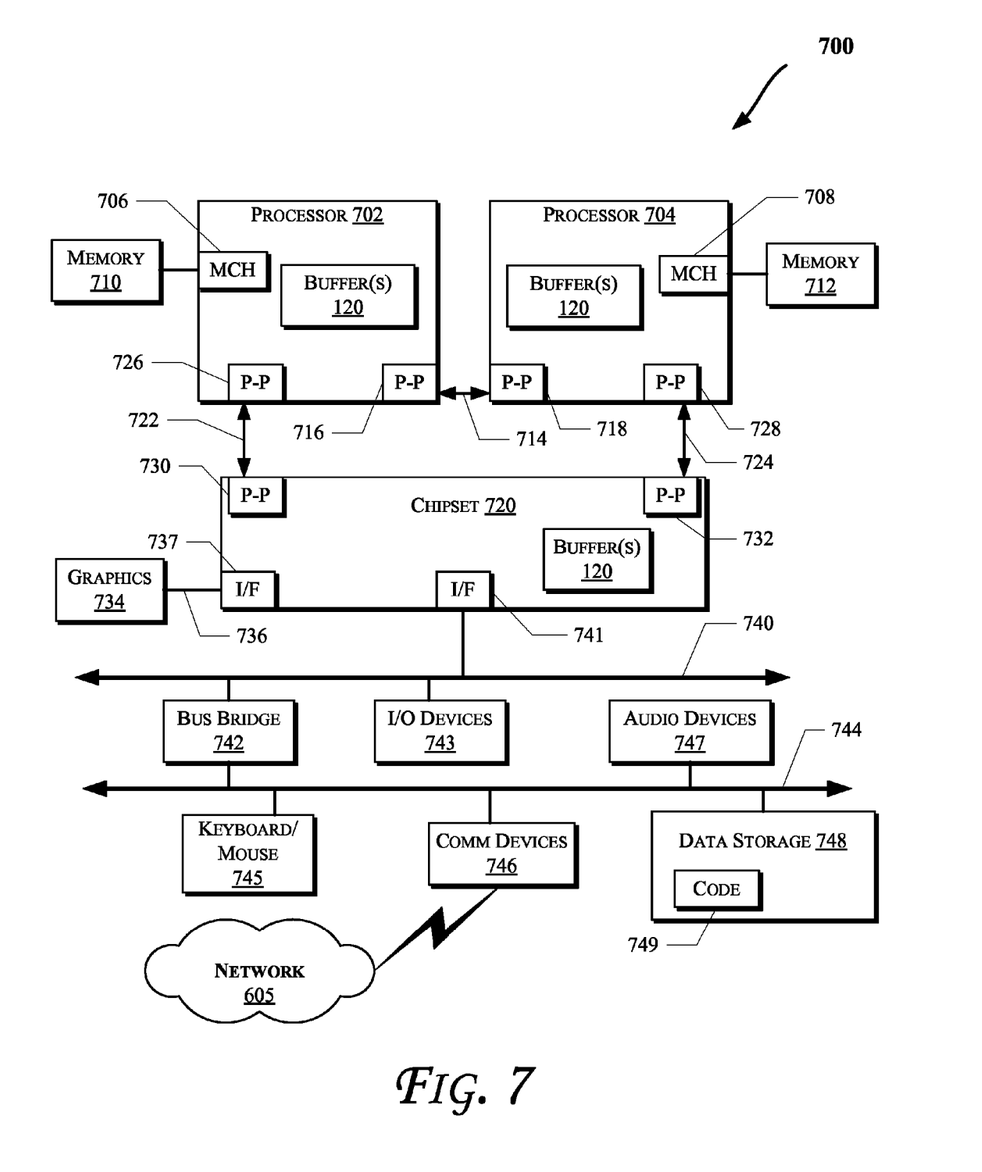

A pipeline buffering (PB) controller logic 220 may control other aspects of finding data and determining physical addresses in on-chip memory 208 (e.g., RAM or DDR memory), for example, based on data stored in the memory 210 (which may be a RAM or Read-Only Memory (ROM) or other forms of memory discussed herein with reference to FIG. 6 or 7). In an embodiment, controller 220 and processor 209 may be coupled to the memory 210 via a multiplexer; however, other embodiments may use a multiport memory to allow access to the memory 210 without a multiplexer. Additionally, any producer's data 222/224 may flow past a level or stage of buffering (e.g., through a multiplexer 226 that selects between data 222 or data 224) if that level of buffering is already full with that producer's data (or any additional data). This way, there is no re-buffering or eviction of data required unless a modified retention policy, e.g., with "single most recent buffered", is used. A multi-level buffering system may be built on the same configurable hardware, e.g., by coupling multiple buffers 120, wherein producer data 222/224 and/or producer data structures 202/204 are passed to a next level buffer.

Moreover, the control processor 209 (or a host processor) may program or configure pipeline buffer controllers 220 (e.g., via memory 210) with producer/consumer information, including for example one or more of: data bus width or structure size in data bus width/RAM words, number of data structures to store for each producer, watermark (also referred to herein interchangeably as "threshold" level) for fetching overflowed structures from down stream local buffers, number of buffers to fetch at once, base data structure address of first structure for each producer, low buffer watermark levels, overflow operations, and/or arbitration operations. The pipeline buffers may also contain ports that allow the control processor (or a host processor) to act as producer or consumer. This, for instance, allows for insertion of a software process between two hardware accelerators or pipeline buffers 120.

In an embodiment, a producer may communicate information including one or more of the following to the buffer 120: producer ID, request/grant, stall, a progressing sequence/data buffer/structure number/count, internal offset address (e.g., in data word), and/or structure access completion signal. In one embodiment, a consumer may communicate information including one or more of the following to the buffer 120: consumer ID, request/grant, stall a progressing sequence/data buffer/structure number/count, internal offset address (e.g., in data word), and/or structure access completion signal. Furthermore, in some embodiments, each producer/consumer pair has a shared initial "base data structure address" that defines the physical location of the first data structure. However, the producers "current data structure address" may be updated with the producer's structure write complete signal. Consumer "current data structure address" may be similarly updated with the consumer's structure read complete signal. The controller 220 may provide updates to hardware that perform the physical address calculation and port arbitration (e.g., arbiter 201 and address generator 211, respectively). Thus, the controller 220 may not be in the critical path of data flow in an embodiment.

Figure 3:
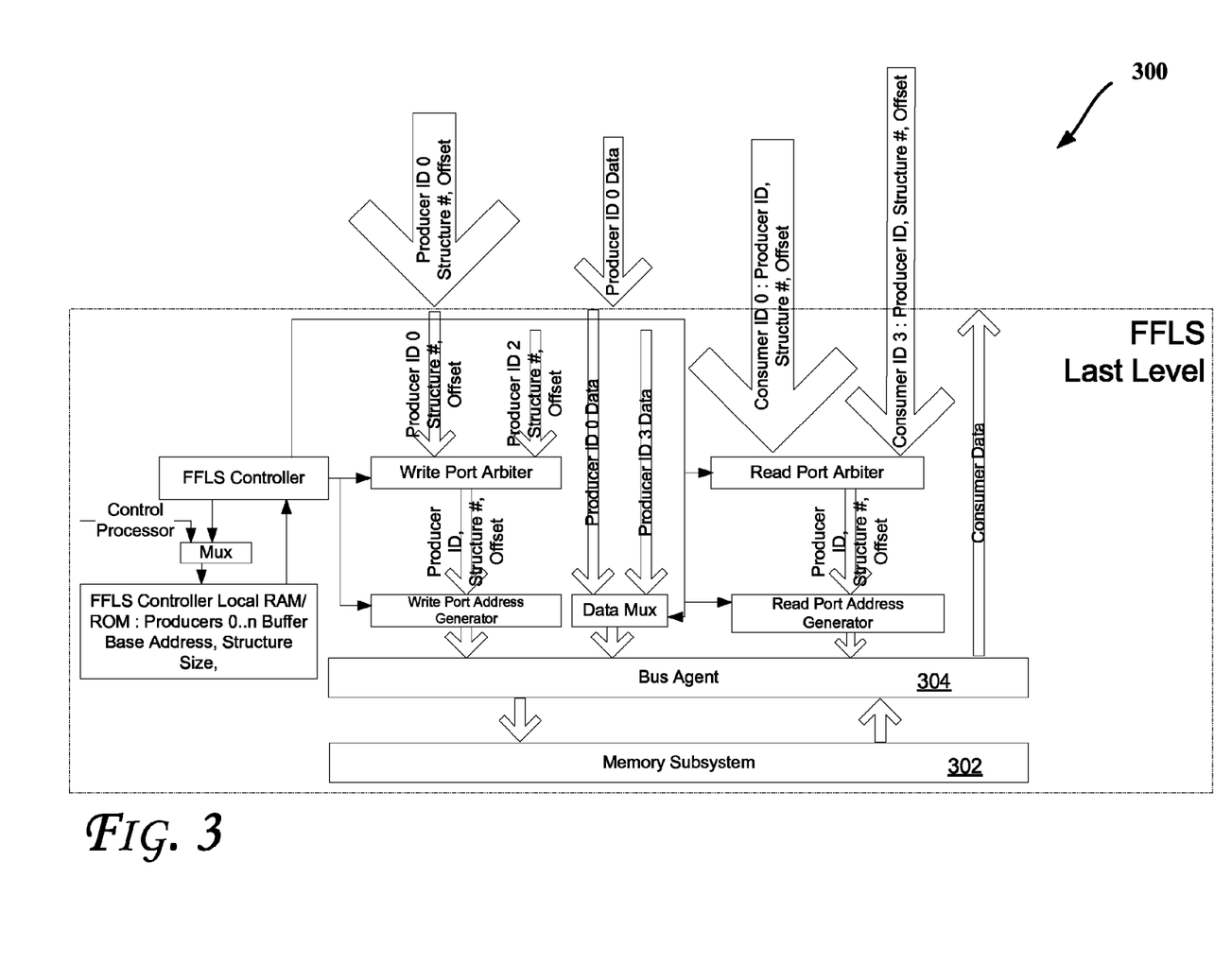

Furthermore, the pipeline buffer controllers may be hierarchically leveled to provide extra on-chip buffering or simplified interfaces to bus agents (such as the bus agent 304 of FIG. 3). The bus agent 304 may provide a shared bus topology to couple one or more other agents to each other communicatively (such as discussed with reference to the fabric 104 of FIG. 1, or other busses discussed herein, e.g., with reference to FIG. 6 or 7). In some embodiments, data from a producer may pass straight through first level buffer to the next pipeline buffer level based on a determination that the first level buffer is full for the producer (or otherwise full and incapable of storing any additional data). Pipeline buffer controller 220 may pre-fetch any data according to watermarks set by the control processor 209 (or a host processor), e.g., into memory 210. Data fetched for consumers may pass straight through to a consumer or to the next pipeline that is not full (where the next pipeline may be directly adjacent or coupled to the full pipeline via other pipeline level(s)).

Not all hierarchical chains terminate at DDR. Some are on-chip only and eventually stall producer. Even local buffers between accelerators that don't spill all the way to DDR can utilize the pipeline buffer protocol when the benefit of the simplified interface outweighs any latency and area concerns of the pipeline buffer controller.

FIG. 3 illustrates a block diagram of a last level FFLS 300, in accordance with an embodiment. As shown in FIG. 3, FFLS 300 may include the same or similar components as the buffer 120 of FIG. 2. Instead of including a memory (such as memory 208 in FIG. 2), FFLS 300 may access the memory subsystem 302 via a bus agent 304 as discussed above. In some embodiments, FIG. 3 illustrates the case when the FFLS controller uses the multi level system configuration, including configuration of bus agent 304 and memory subsystem 302, to determine which requester to service and FIG. 2 illustrates control of the data mux 226 by the write port arbiter 201 as per item 206 (e.g., where 206 is the simpler method and may be implemented in the first or single level system where knowledge of 304 and 302 are not needed).

Moreover, the next generation consumer electronics silicon components may require hardware configurability, programmability, and flexibility to simultaneously support multiple product lines with minimal redesign and revalidation. Concurrent product development with different power, area, and memory performance requirements from different market segments demand accelerated schedules. The architecture discussed herein separates the design of accelerators from the design of the pipeline buffering. This provides a reduction of dependencies and allows the correct design problems to be solved in the correct domain. The accelerators may be designed as hardware configurable blocks with varying pixel processing widths, and programmable control to support multiple formats. The accelerators may be designed and validated once for a given set of formats. The pipeline buffering is designed once, but may be optimized for each product. The accelerators may be designed with a standardized protocol and simplified interfaces to support transfer of data from or to other major accelerators in the pipelines. As discussed herein, a complete pipeline may include a group of accelerators coupled together through the pipeline buffering. The pipeline buffering provides a mechanism to transfer data from one accelerator to another. It also provides over buffering management and pre-fetch capabilities, e.g., for accelerators with mismatched throughputs.

Additionally, design problems solved in the accelerators may include definition of internal data structures to support multi-format processing; meeting throughput requirements in the complex power, area, and real time processing space; latency between processing elements; and/or maintaining data ordering such as raster row ordering. Design problems solved in the pipeline buffering may include buffer architecture (e.g., cache versus linear buffering); over buffer management; buffer sizing; bus agent complexity (e.g. read around writes); arbitration policies; memory controller interfaces; pre-fetch levels and sizing; and/or eviction policies. Once the accelerators and pipeline buffering is put together into a complete pipeline, further optimization is possible based on performance validation. The optimization may be limited to buffer sizing and bus width sizing in the pipeline buffering in some embodiments.

Accordingly, some embodiments (e.g., including a protocol, apparatus, methods, systems, etc. discussed herein) may be utilized for concurrent design of next generation audio, video, security, network, chipset, processor and other pipelined accelerators for use in silicon components. Such designs may provide improved buffer optimization and accelerated product schedules, while potentially saving costs.

Figure 4:
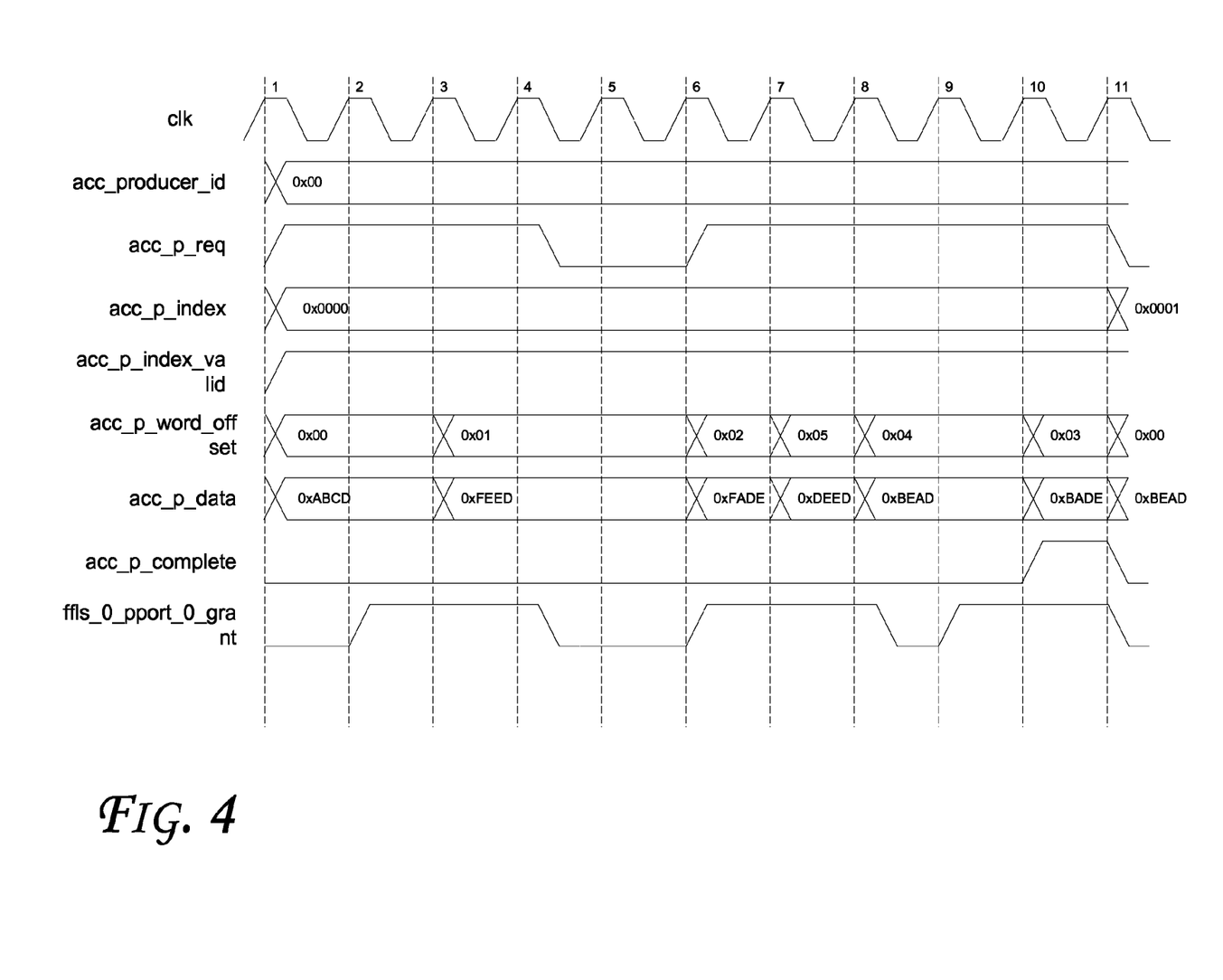
FIGS. 4-5 illustrate timing diagrams according to some embodiments.
Figure 5:
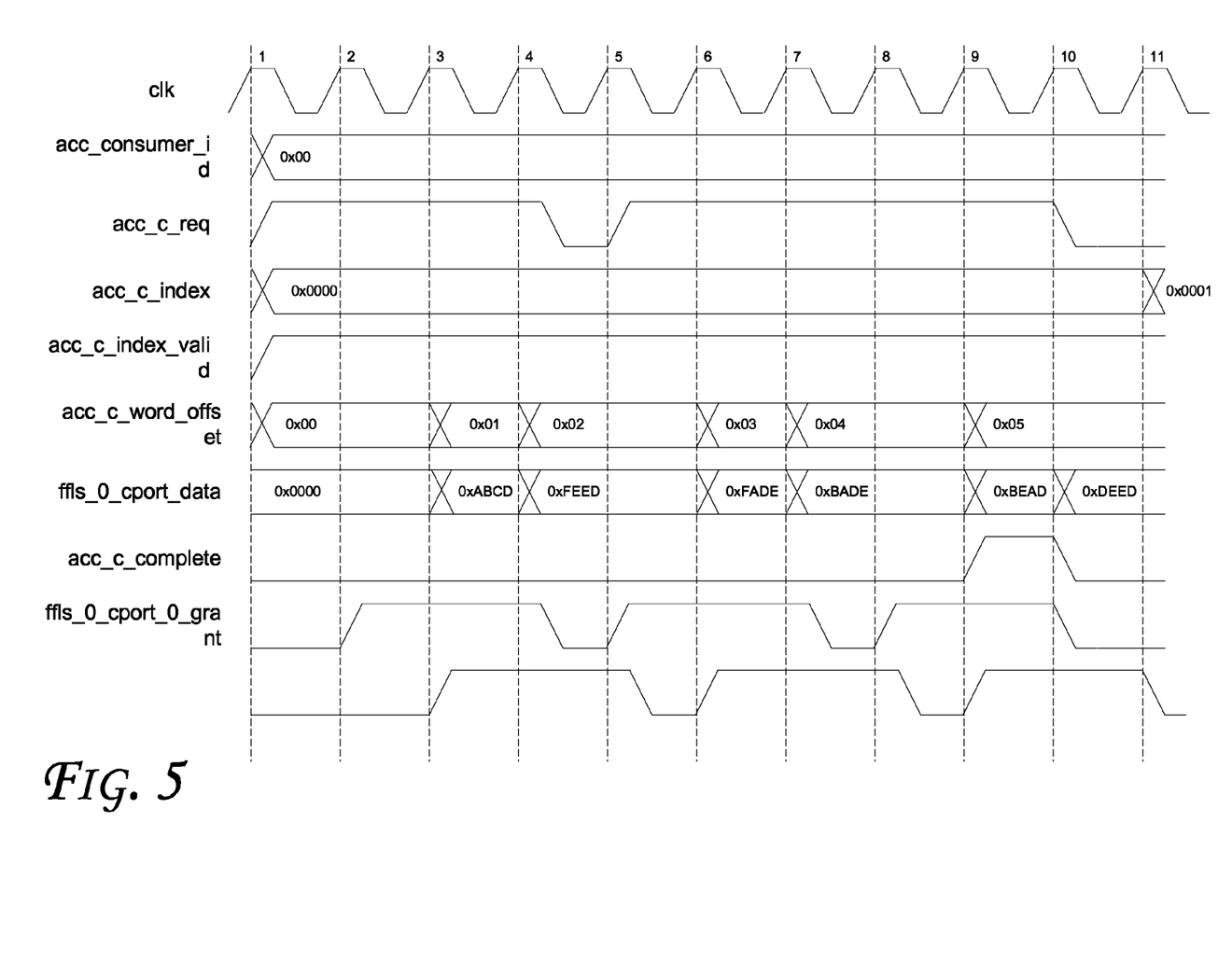

FIG. 4 illustrates a producer interface timing diagram according to an embodiment. FIG. 5 illustrates a consumer interface timing diagram according to an embodiment. Tables 1 and 2 below respectively indicate what each signal in FIGS. 4-5 refer to, according to some embodiment (where "clk" refers to clock signal having the enumerated cycles).

TABLE 1 corresponding to signals of FIG. 4

| NAME | FFLS I/O | WIDTH IN BITS | DESCRIPTION |
| --- | --- | --- | --- |
| acc_c_consumer_id | I | 8 - parameterized at MFX level | This is the consumer's unique ID in the FFLS pipeline buffering. |
| acc_c_req | I | 1 | Consumer requests reading from the FFLS buffer. |
| acc_c_index | I | 16 - parameterized at MFX level | A unique index into the array of packets stored in the FFLS buffer system including memory/DDR. This index value does not imply the location of the specific packet, but rather a tag that allows the controller to determine its location in on-chip memory, e.g., SRAM or system DDR. |
| acc_c_index_valid | I | 1 | Indicates FFLS uses index from the consumer. Otherwise, uses a simple counter that increments when complete is indicated. |
| acc_c_word_offset | I | varies with consumer's packet structure's number of words. | The data word within the packet that the consumer is requesting to write. |
| acc_c_complete | I | 1 | Indicates the consumer has completed reading from the individual packet in the FFLS. The FFLS controller will increment its index to the next packet if index_valid is not set. |
| ffls_x_cport_data | O | varies with producer and memory implementation | The data word the producer is requesting to write. |
| ffls_x_cport_n_grant | O | 1 | Indicates the FFLS has accepted the request, and the consumer can request the next data. The grant is issued on a cycle by cycle basis. It can be deasserted due to servicing other requesters, burst length limitations, etc. |
| ffls_x_cport_n_data_valid | O | 1 | Indicates the FFLS has produced the requested data on the ffls_x_cport_data bus. ffls_x_cport_n_data_valid assertion follows |

TABLE 1-continued corresponding to signals of FIG. 4

| NAME | FFLS I/O | WIDTH IN BITS | DESCRIPTION |
|---|---|---|---|
| | | | ffls_x_cport_n_grant by a varying number of clocks that depends on the characteristics of the physical memory/RAM implementation. |

* ffls_x_cport_n where x is the number of the ffls instance and n is the port number on the ffls instance

TABLE 2 corresponding to signals of FIG. 5

| NAME* | FFLS I/O | WIDTH IN BITS | DESCRIPTION |
|---|---|---|---|
| acc_producer_id | I | 8 - parameterized at MFX level | This is the producer's unique ID in the FFLS pipeline buffering. This can be tied off to a specific value if the accelerator will have only that producer id request across the specific physical interface. |
| acc_p_req | I | 1 | Producer requests writing into the FFLS buffer. |
| acc_p_index | I | 16 - parameterized at MFX level | A unique index into the array of packets stored in the FFLS buffer system including memory/DDR. This index value does not imply the location of the specific packet, but rather a unique tag that allows the controller to determine its location in on-chip memory such SRAM or system DDR. |
| acc_p_index_valid | I | 1 | Indicates FFLS uses index from the producer. Otherwise, the controller uses a simple counter that increments when the packet access is completed. |
| acc_p_word_offset | I | varies with producer's packet structure's number of words. | The data word within the packet that the producer is requesting to write. |
| acc_p_data | I | varies with producer and memory implementation | The data word the producer is requesting to write. |
| acc_p_complete | I | 1 | Indicates the producer has completed writing into the individual packet in the FFLS. The FFLS controller will increment its index to the next packet if index_valid is not set. |
| ffls_x_pport_n_grant | O | 1 | Indicates the FFLS has accepted the data word write, and the requester is free to change interface values for the next request and data word. The grant is issued on a cycle by cycle basis. It can be deasserted due to servicing other requesters, burst length limitations, etc. |

*ffls_x_pport_n where x is the number of the ffls instance and n is the port number on the ffls instance FIG. 6 illustrates a block diagram of an embodiment of a computing system 600. One or more of the agents 102 of FIG. 1 may comprise one or more components of the computing system 600. Also, various components of the system 600 may include a buffer (e.g., such as buffer 120/300 of FIGS. 1-5). The computing system 600 may include one or more central processing unit(s) (CPUs) 602 (which may be collectively referred to herein as "processors 602" or more generically "processor 602") coupled to an interconnection network (or bus) 604. The processors 602 may be any type of processor such as a general purpose processor, a network processor (which may process data communicated over a computer network 605), etc. (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

The processor 602 may include one or more buffers (e.g., other than the illustrated buffer 120 and/or 300), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 600. Additionally, such cache(s) may be located in various locations (e.g., inside other components to the computing systems discussed herein, including systems of FIG. 1 or 7).

A chipset 606 may additionally be coupled to the interconnection network 604. Further, the chipset 606 may include a graphics memory control hub (GMCH) 608. The GMCH 608 may include a memory controller 610 that is coupled to a memory 612. The memory 612 may store data, e.g., including sequences of instructions that are executed by the processor 602, or any other device in communication with components of the computing system 600. Also, in one embodiment of the invention, the memory 612 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 604, such as multiple processors and/or multiple system memories.

The GMCH 608 may further include a graphics interface 614 coupled to a display device 616 (e.g., via a graphics accelerator in an embodiment). In one embodiment, the graphics interface 614 may be coupled to the display device 616 via an accelerated graphics port (AGP). In an embodiment of the invention, the display device 616 (such as a flat panel display) may be coupled to the graphics interface 614 through, for example, a signal converter that translates a digital representation of an image stored in a storage device such as video memory or system memory (e.g., memory 612) into display signals that are interpreted and displayed by the display 616.

As shown in FIG. 6, a hub interface 618 may couple the GMCH 608 to an input/output control hub (ICH) 620. The ICH 620 may provide an interface to input/output (I/O) devices coupled to the computing system 600. The ICH 620 may be coupled to a bus 622 through a peripheral bridge (or controller) 624, such as a peripheral component interconnect (PCI) bridge that may be compliant with the PCIe specification, a universal serial bus (USB) controller, etc. The bridge 624 may provide a data path between the processor 602 and peripheral devices. Other types of topologies may be utilized. Also, multiple buses may be coupled to the ICH 620, e.g., through multiple bridges or controllers. Further, the bus 622 may comprise other types and configurations of bus systems. Moreover, other peripherals coupled to the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 622 may be coupled to an audio device 626, one or more disk drive(s) 628, and a network adapter 630 (which may be a NIC in an embodiment). In one embodiment, the network adapter 630 or other devices coupled to the bus 622 may communicate with the chipset 606. Also, various components (such as the network adapter 630) may be coupled to the GMCH 608 in some embodiments of the invention. In addition, the processor 602 and the GMCH 608 may be combined to form a single chip. In an embodiment, the memory controller 610 may be provided in one or more of the CPUs 602. Further, in an embodiment, GMCH 608 and ICH 620 may be combined into a Peripheral Control Hub (PCH).

Additionally, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 612 may include one or more of the following in an embodiment: an operating system (O/S) 632, application 634, directory 601, and/or device driver 636. The memory 612 may also include regions dedicated to Memory Mapped I/O (MMIO) operations. Programs and/or data stored in the memory 612 may be swapped into the disk drive 628 as part of memory management operations. The application(s) 634 may execute (e.g., on the processor(s) 602) to communicate one or more packets with one or more computing devices coupled to the network 605. In an embodiment, a packet may be a sequence of one or more symbols and/or values that may be encoded by one or more electrical signals transmitted from at least one sender to at least on receiver (e.g., over a network such as the network 605). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 605).

In an embodiment, the application 634 may utilize the O/S 632 to communicate with various components of the system 600, e.g., through the device driver 636. Hence, the device driver 636 may include network adapter 630 specific commands to provide a communication interface between the O/S 632 and the network adapter 630, or other I/O devices coupled to the system 600, e.g., via the chipset 606.

In an embodiment, the O/S 632 may include a network protocol stack. A protocol stack generally refers to a set of procedures or programs that may be executed to process packets sent over a network 605, where the packets may conform to a specified protocol. For example, TCP/IP (Transport Control Protocol/Internet Protocol) packets may be processed using a TCP/IP stack. The device driver 636 may indicate the buffers in the memory 612 that are to be processed, e.g., via the protocol stack.

The network 605 may include any type of computer network. The network adapter 630 may further include a direct memory access (DMA) engine, which writes packets to buffers (e.g., stored in the memory 612) assigned to available descriptors (e.g., stored in the memory 612) to transmit and/or receive data over the network 605. Additionally, the network adapter 630 may include a network adapter controller, which may include logic (such as one or more programmable processors) to perform adapter related operations. In an embodiment, the adapter controller may be a MAC (media access control) component. The network adapter 630 may further include a memory, such as any type of volatile/nonvolatile memory (e.g., including one or more cache(s) and/or other memory types discussed with reference to memory 612).

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (GMCH) 706 and 708 to enable communication with memories 710 and 712. The memories 710 and/or 712 may store various data such as those discussed with reference to the memory 612 of FIG. 6. As shown in FIG. 7, the processors 702 and 704 (or other components of system 700 such as chipset 720, I/O devices 743, etc.) may also include one or more cache(s) such as those discussed with reference to FIGS. 1-6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, the buffer 120 of FIG. 2 (and/or 300 of FIG. 3) may be provided in one or more of the processors 702, 704 and/or chipset 720. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 605), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
an arbiter to receive information corresponding to a transaction from a producer, wherein the producer is to generate the transaction and the transaction is to comprise formatting information;
memory to store the information corresponding to the transaction; and
an address generator to generate an address in the memory corresponding to a location in the memory that is to store the information corresponding to the transaction based on an identifier of the producer,
wherein a consumer is to read the information corresponding to the transaction from the memory, in response to a signal that indicates the information is stored in its entirety in the memory, and the consumer is to process data from the producer in accordance with the formatting information of the transaction, wherein a buffer is to comprise a plurality of buffer levels and at least a first level buffer and a second level buffer are each to comprise the memory, the address generator, and the arbiter, wherein additional data from the producer is to be passed through the first level buffer to the second level buffer in response to a determination that the first level buffer is full and without evicting any data from the first level buffer.

2. The apparatus of claim 1, further comprising a controller logic to control an operation of the arbiter and the address generator.

3. The apparatus of claim 1, further comprising a controller logic to prefetch data corresponding to the producer into a local memory.

4. The apparatus of claim 1, further comprising a first level that comprises the memory, the address generator, and the arbiter, wherein the apparatus is to further comprise a second level which is to comprise:
another arbiter to receive the information corresponding to the transaction from the producer;
another address generator to generate an address in a memory subsystem corresponding to a location in the memory subsystem that is to store the information corresponding to the transaction; and
a bus agent to couple the other address generator to the memory subsystem.

5. The apparatus of claim 4, wherein the consumer is to read the information corresponding to the transaction from the memory subsystem in response to a grant signal to indicate the information is stored in its entirety in the memory subsystem.

6. The apparatus of claim 1, wherein the memory is to store the transaction based on a base address and an offset.

7. The apparatus of claim 1, further comprising a controller logic to control an operation of the arbiter and the address generator, wherein the controller logic is to be configured by a processor with producer or consumer information comprising one or more of: data bus width, number of transactions to store for each producer, threshold for fetching overflowed structures from down stream buffer levels, a number of buffers to fetch at once, a base transaction address of first structure for each producer, low buffer threshold levels, overflow operations, or arbitration operations.

8. The apparatus of claim 1, wherein the address generator is to generate the address based on the identifier of the producer and a structure number or index.

9. The apparatus of claim 1, wherein the address generator is to generate the address based on the identifier of the producer, a structure number or index, and a sub-structure offset.

10. The apparatus of claim 1, wherein the additional data from the producer is to be passed through the first level buffer to the second level buffer in response to the determination that the first level buffer is full and without rebuffering the additional data prior to storing the additional data in the second level buffer.

11. A system comprising:
controller hardware logic to control an arbiter, wherein the arbiter is to receive information corresponding to a transaction from a producer, wherein the producer is to generate the transaction and the transaction is to comprise formatting information;
a processor to configure the controller hardware logic with producer or consumer information;
memory to store the information corresponding to the transaction based on an identifier of the producer; and
an address generator to generate an address in the memory corresponding to a location in the memory that is to store the information corresponding to the transaction, wherein a consumer is to read the information corresponding to the transaction from the memory, in response to a signal that indicates the information is stored in its entirety in the memory, and process data from the producer in accordance with the formatting information of the transaction, wherein a buffer is to comprise a plurality of buffer levels and at least a first level buffer and a second level buffer are each to comprise the memory, the address generator, and the arbiter, wherein additional data from the producer is to be passed through the first level buffer to the second level buffer in response to a determination that the first level buffer is full and without evicting any data from the first level buffer.

12. The system of claim 11, wherein the controller hardware logic is to control an operation of the address generator.

13. The system of claim 11, wherein the controller hardware logic is to prefetch data corresponding to the producer into a local memory of the buffer.

14. The system of claim 11, wherein the memory is to store the transaction based on a base address and an offset.

15. The system of claim 11, wherein the additional data from the producer is to be passed through the first level buffer to the second level buffer in response to the determination that the first level buffer is full and without rebuffering the additional data prior to storing the additional data in the second level buffer.

16. A method comprising:
receiving information corresponding to a transaction from a producer, wherein the producer is to generate the transaction and the transaction is to comprise formatting information;
storing the information corresponding to the transaction in memory;
generating an address in the memory corresponding to a location in the memory that is to store the information corresponding to the transaction based on an identifier of the producer; and
reading, at a consumer, the information corresponding to the transaction from the memory, in response to a signal that indicates the information is stored in its entirety in the memory, wherein a buffer is to comprise a plurality of buffer levels and at least a first level buffer and a second level buffer are each to comprise the memory, wherein additional data from the producer is to be passed through the first level buffer to the second level buffer in response to a determination that the first level buffer is full and without evicting any data from the first level buffer.

17. The method of claim 16, further comprising processing data from the producer in accordance with the formatting information of the transaction.

18. The method of claim 16, further comprising prefetching data corresponding to the producer into a local memory of the buffer.

19. The method of claim 16, wherein the second level is to comprise a bus agent to access a memory subsystem.

20. The method of claim 19, further comprising the consumer reading the information corresponding to the transaction from the memory subsystem in response to a grant signal to indicate the information is stored in its entirety in the memory subsystem.

21. The method of claim 16, wherein storing the information in the memory is to be performed based on a base address and an offset.

22. The method of claim 16, wherein the additional data from the producer is to be passed through the first level buffer to the second level buffer in response to the determination that the first level buffer is full and without rebuffering the additional data prior to storing the additional data in the second level buffer.

23. A non-transitory computer-readable medium to store one or more instructions that when executed by a processor perform one or more operations to:
receive information corresponding to a transaction from a producer, wherein the producer is to generate the transaction and the transaction is to comprise formatting information;
store the information corresponding to the transaction in a memory;
generate an address in the memory corresponding to a location in the memory that is to store the information corresponding to the transaction based on an identifier of the producer; and
read, at a consumer, the information corresponding to the transaction from the memory, in response to a signal that indicates the information is stored in its entirety in the memory, wherein a buffer is to comprise a plurality of buffer levels and at least a first level buffer and a second level buffer are each to comprise the memory, wherein additional data from the producer is to be passed through the first level buffer to the second level buffer in response to a determination that the first level buffer is full and without evicting any data from the first level buffer.

24. The medium of claim 23, wherein the one or more instructions cause the processor to process data from the producer in accordance with the formatting information of the transaction.

25. The medium of claim 23, wherein the one or more instructions cause the processor to prefetch data corresponding to the producer into a local memory of the buffer.

26. The medium of claim 23, wherein the second level is to comprise a bus agent to access a memory subsystem.

27. The medium of claim 26, wherein the one or more instructions cause the consumer to read the information corresponding to the transaction from the memory subsystem in response to a grant signal to indicate the information is stored in its entirety in the memory subsystem.

28. The medium of claim 23, wherein the one or more instructions cause the processor to store the information in the memory is to be performed based on a base address and an offset.

29. The non-transitory computer-readable medium of claim 23, wherein the additional data from the producer is to be passed through the first level buffer to the second level buffer in response to the determination that the first level buffer is full and without rebuffering the additional data prior to storing the additional data in the second level buffer.

* * * * *